United States Patent [19]

Chittofrati et al.

[11] Patent Number: 4,994,156

[45] Date of Patent: Feb. 19, 1991

[54] ELECTRICALLY CONDUCTIVE OIL-IN-WATER MICROEMULSIONS BASED ON PERFLUORINATED COMPOUNDS AND USED AS A CATHOLYTE IN ELECTROCHEMICAL PROCESSES

[75] Inventors: Alba Chittofrati, Milan; Angelo Tentorio, Novara; Mario Visca, Alessandria, all of Italy

[73] Assignee: Ausimont, S.R.L., Milan, Italy

[21] Appl. No.: 367,859

[22] Filed: Jun. 19, 1989

[30] Foreign Application Priority Data

Jun. 17, 1988 [IT]   Italy ................................ 21005 A/88

[51] Int. Cl.$^5$ ................................................ C25B 1/00
[52] U.S. Cl. ...................................... 204/98; 204/101; 204/292; 429/190
[58] Field of Search ................. 204/98, 101, 129, 292; 429/190; 252/500, 308, 312

[56] References Cited

U.S. PATENT DOCUMENTS 4,853,097  1/1989  Marchionni et al. ............. 204/157.6

FOREIGN PATENT DOCUMENTS 0280312  8/1988  European Pat. Off. .
0315841  5/1989  European Pat. Off. .
0340740  11/1989  European Pat. Off. .

Primary Examiner—John F. Niebling
Assistant Examiner—Kathryn Gorgos
Attorney, Agent, or Firm—Morgan & Finnegan

[57] ABSTRACT

An electrochemical process, in which a gaseous matter is reduced at the cathode and in which microemulsions of the oil-in-water (o/w) type are utilized as catholytes, the microemulsions having ionic electric transfer and matter interphase transfer capacities, and in which the oil phase consists of a perfluoropolyether having perfluoroalkyl end groups or functional end groups of the hydrophilic type, or of perfluorocarbons, the microemulsions being obtained by the use of perfluorinated surfactants, in particular those having a perfluoroalkyl-polyether structure and/or by the use of an alcohol as a co-surfactant.

12 Claims, No Drawings

ELECTRICALLY CONDUCTIVE OIL-IN-WATER MICROEMULSIONS BASED ON PERFLUORINATED COMPOUNDS AND USED AS A CATHOLYTE IN ELECTROCHEMICAL PROCESSES

DESCRIPTION OF THE INVENTION

1. Field of the Invention

The present invention relates to the use of perfluorinated oil-in-water (w/o) microemulsions as a catholyte in electrolytic processes. In particular, the perfluorinated oils are of the perfluoropolyether type.

2. Background of the Invention

The necessity was felt to have available electrochemical processes in which it is possible to obtain a high current density with the minimum cell voltage, for example, by reducing the hydrogen discharge overvoltage thanks to the use of catalyzed electrodes as a cathode.

A possible alternative is represented by a cathodic reaction which—the anodic reaction being equal—should occur at a lower reversible potential difference value.

It is well known from electrochemical processes, in particular from voltametry, how a gas-saturated (for example an $O_2$-saturated) saline aqueous solution exhibits limit values of the reducing current of said gas as a function of the temperature and of the angular revolving speed ($\cap$) of the working electrode, which are determined by the low solubility of the gas in the electrolyte. Conversely, the $H_2$ evolution current is solely a function of the potential and of the temperature, as the reduction of $H^+$ ions to $H_2$ is substantially independent of the diffusion and, therefore, independent of $\cap$.

DETAILED DESCRIPTION OF THE INVENTION

In accordance with the present invention, it has, surprisingly, been found that by carrying out voltametric processes on the o/w microemulsions of the present invention, having an electrical conductance preferably of at least 1 milliS.cm$^{-1}$, the diffusion limit current density of the gas which reduces at the cathode is much higher than the diffusion current of the same gas in an aqueous saline solution, when operating at the same temperature and at the same rotational speed of the electrode.

A further surprising aspect of the present invention is that—the current density and the anodic process being equal—the difference between the cathodic potential of a process in a microemulsion (for example the reduction of $O_2$ to $OH^-$) and the cathodic potential of a reference process in an aqueous solution (typically the $H_2$ evolution) is such that the electrolysis in microemulsion permits one to save power as compared to the electrolysis in aqueous phase.

At the limit, in the microemulsion, it is possible to observe the passage of a considerable current supported by the oxygen reduction to cathodic potentials, at which no $H^+$ discharge is observed in the reference solution.

It is apparent that it is necessary to compare—under the same current conditions—the $O_2$ reduction cathodic process in microemulsion with the $H_2$ evolution in aqueous solution, as the $O_2$ reduction in aqueous solution can occur only at a low current density, limited by the low solubility of the gas and, in consequence, of the diffusion process.

Thus, an object of the present invention is an electrochemical process wherein a gaseous matter is reduced at the cathode and wherein oil-in-water (o/w) microemulsions having an electrical conductance (due to ionic transfer) of at least 1 millisiemens.cm$^{-1}$ are utilized as a catholyte.

In particular, microemulsions of water in perfluoropolyethers or perfluorocarbons in water having an electrical conductance of at least 1 millisiemens.cm$^{-1}$ are used as catholytes for the cathodic reduction of oxygen.

The microemulsions of the present invention have been described in Italian patent applications Nos. 20,910 A/86, 19,494 A/87, and 19,495 A/87.

Whenever used in the present application, the term "microemulsion" includes also systems in which the molecular orientation in the interphase leads to the formation of nonoptically isotropic systems, characterized by double refraction and probably consisting of oriented structures of fluid-crystalline type (liquid crystals).

The microemulsions of the present invention are mixtures which macroscopically consist of only one limpid or opalescent phase, which is indefinitely stable in the operative temperature range, said mixtures comprising:

(a) an aqueous liquid optionally containing one or more electrolytes; (b) fluid with perfluoropolyether structure having perfluoroalkyl or functional end groups, with carboxylic, alcoholic, polyoxyalkylene-OH, ester, amide, etc. functionality, and preferably hydrophilic functional groups, such as carboxylic and polyoxyalkylene-OH groups, and in particular the carboxylic group;

(c) a fluorinated surfactant, preferably having a perfluoropolyether structure; and/or:
  a hydrogenated alcohol $C_1$-$C_{12}$, preferably $C_1$-$C_6$, and optionally a fluorinated alcohol (cosurfactant).

The microemulsions of the present invention may be optically isotropic or birefractive, are of the oil-in-water (o/w) type, and are characterized in that they are conductive, their conductance being at least 1 milliS.cm$^{-1}$.

Since the microemulsions of the present invention are of the o/w type, they must contain the PFPE as a "dispersed phase," and, therefore, the aqueous phase should preferably be in excess (as to volume) with respect to the perfluoropolyether phase.

Perfluoropolyethers (PFPE) suitable for forming the microemulsions of the present invention are:

(a) PFPE having an average molecular weight ranging from 500 to 10,000, preferably from 600 to 6,000, having perfluoroalkyl end groups and belonging to one or more of the following classes:

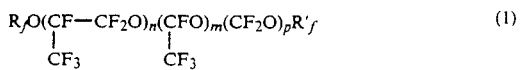

with a random distribution of the perfluorooxyalkylene units, wherein $R_2$ and $R'_f$, alike or different from each other, are —$CF_3$, —$C_2F_5$, —$C_3F_7$, and m, n, p have such mean values as to meet the above average molecular weight (m.w.) requirements.

with a random distribution of the perfluorooxyalkylene units, where $R_f$ and $R'_f$ alike or different from each other, are $-CF_3$ or $-C_2F_5$ and m and n have such mean values as to meet the above m.w. requirements.

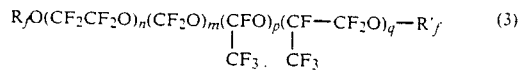

with a random distribution of the perfluorooxyalkylene units, where $R_f$ and $R'_f$ alike or different from each other, are $-CF_3$, $-C_2F_5$, or $-C_3F_7$, and m, n, p, q have such mean values as to meet the above m.w. requirements.

where $R_f$ and $R'_f$ alike or different from each other, are $-C_2F_5$ or $-C_3F_7$ and n has such a mean value as to meet the above m.w. requirements.

(5) $R_fO(CF_2CH_2O)_nR'_f$, where $R_f$ and $R'_f$ alike or different from each other, are $-CF_3$, $-C_2F_5$, and n has such a mean value as to meet the above m.w. requirements.

(6) $R_fO(CF_2CF_2CF_2O)_nR'_f$ where $R_f$ and $R'_f$ alike or different from each other, are $-CF_3$, $-C_2F_5$ or $-C_3F_7$, n having such a mean value as to meet the above m.w. requirements.

(7) PFPE having the structure of class 1 or class 3, in which one of the two end groups R: and $R'_f$, contains one or two chlorine atoms, as described in the commonly-owned Italian patent application No. 20,406 A/88.

(b) PFPE belonging to the above classes, having an average molecular weight ranging from 1,500 to 10,000, and preferably lower than 6,000, characterized in that they contain on the average from 0.1 to 4 non-perfluoroalkyl end groups per polymeric chain, and preferably from 0.3 to 1.

(c) Perfluoropolyethers described in Italian patent application No. 20,346 A/86, having functional groups along the perfluoropolyether chain and end groups of the perfluoroalkyl or functional type.

As non-perfluoroalkyl end groups and as functional groups in the chain, there are meant, for example, carboxylate, alcoholic, polyoxyalkylene-OH, etc., groups.

Most suitable functional end groups or functional groups in the chain are those of the hydrophilic type, and in particular the carboxylic group.

The functional end groups or the functional groups in the chain, of the above type, may be linked to the perfluoropolyether chain through a $-CFX-$ group in which X is F or $CF_3$ optionally followed by a linking group consisting of a divalent non-fluorinated radical of the alkylene or arylene type, containing up to 20 carbon atoms, preferably containing-1 to 8 carbon atoms, according to the sequence: perfluoropolyether chain-CFX-non-fluorinated radical-functional group.

It is to be understood that the perfluoropolyethers to be used according to the present invention are also those of classes 1, 2 and 3 containing peroxy bridges in the chain and having acid end groups, which are obtained as rough products of the photo-oxidation process utilized for synthesizing the above PFPE.

Perfluoropolyethers of class (1) are commercially known under the trademark Fomblin® Y or Galden®, those of class (2) are commercially known under the trademark Fomblin® Z, all of them being produced by Montedison S.p.A.

The products of class (3) are prepared according to U.S. Pat. No. 3,665,041.

Commercially known products of class (4) are the Krytox (Dupont).

The products of class (5) are described in U.S. Pat. No 4,523,039.

The products of class (6) are described in European patent EP No. 148,482 to Daikin.

Other suitable perfluoropolyethers are those described by Lagow et al. in U.S. Pat. No. 4,523,039 or in J. Am. Chem. Soc. 1985, 107, 1197-1201.

The fluorinated surfactants contained in the microemulsions of the present invention may be ionic or non-ionic. In particular the following may be cited:

(a) salts of perfluoroalkylcarboxylic acids having 5 to 11 carbon atoms;

(b) salts of perfluorosulphonic acids having 5 to 11 carbon atoms;

(c) non-ionic surfactants indicated in European patent application No. 0,051,526, and consisting of a perfluoroalkylene chain and a polyoxyalkylene hydrophilic head;

(d) salts of mono- and di-carboxylic acids derived from perfluoropolyethers;

(e) non-ionic surfactants consisting of a perfluoropolyether chain linked to a polyoxyalkylene chain.

(f) perfluorinated cationic surfactants or surfactants derived from perfluoropolyethers having 1, 2 or 3 hydrophobic chains.

The preferred surfactants are those of the ionic type.

Furthermore, the system may contain one or more cosurfactants belonging to one of the following classes: hydrogenated alcohols having 1 to 12 carbon atoms; alcohols containing a perfluoropolyether chain; partially fluorinated alcohols.

The aqueous liquid may consist of water or may be an aqueous solution of inorganic electrolytes (salts, acids, or alkalies).

The o/w microemulsions of the present invention which are utilizable as a catholyte for gas cathodic reduction reactions may also comprise, as a continuous oily phase, a perfluorocarbon instead of a perfluoropolyether, on condition that preferably such microemulsion has a conductance of at least 1 millisiemens.cm$^{-1}$.

Perfluorocarbon microemulsions are well known in the art—see for example European patent application No. 51,526.

However, the use of o/w conductive microemulsions, in which the oil is a perfluoropolyether, is particularly preferred.

The microemulsions to be used as a catholyte are prepared by mixing the individual components in any order.

According to the present invention, the use, as a catholyte, of o/w microemulsions having a conductivity equal to at least 1 milliS.cm$^{-1}$ relates to electrolytic reactions of any gas that can be reduced at the cathode. In particular, oxygen has been used, and, therefore, all the voltametric tests reported hereinafter and the corresponding evaluations will involve the cathodic reaction:

$$O_2 + 2H_2O + 4e^- \rightarrow 4OH^-$$

but it is to be understood that said evaluations are to be considered as illustrative and not limitative.

From the electrolysis in aqueous solution of $(NH_4)_2SO_4$, saturated with $O_2$, there were obtained the values of $O_2$-reduction diffusion limit-current as a function of temperature and angular rotational speed ($\omega$) of the working Pt electrode, and of the $H_2$ evolution current as a function of potential and temperatures, as the $H^+$ reduction is substantially independent of the diffusion and, therefore, is independent of $\omega$.

Electrolyses are carried out by using, as a catholyte, the microemulsion ($\mu E$), at the same temperatures and at the same $\omega$, taking note of:

(1) $O_2$-diffusion limit-current density and increase of same with respect to the diffusion current of the same in an aqueous medium;

(2) cathodic potential difference—the current density being equal—between a cathodic process in microemulsion (typically $O_2$ reduction) and a reference cathodic process in aqueous solution (typically with $H_2$ evolution).

The $O_2$-reduction limit current indicated in each example is always referred to as a cathodic potential which is lower by 200 mV than the value at which the $H_2$ evolution in the examined system begins.

In order to measure the current as a function of the applied potential, it was operated by voltametry, using as a catholyte various $\mu E$ and as an anolyte an aqueous solution of concentrated inorganic electrolyte.

Electrolyses were conducted by means of a multipolarograph Amel 472, in a 3-electrode cell:

working electrode of the Pt rotating disc type, having a geometric surface area of 3.14 mm$^2$, immersed in $\mu E$;

Pt counter-electrode immersed in an aqueous solution of $(NH_4)_2SO_4$ (3 moles/liter), separated from the $\mu E$ by an agar-agar septum;

reference calomel electrode (SCE) immersed in a saline bridge (KCl solution, 3 moles/l) with a Luggin capillary facing the working electrode surface.

All the cathodic potential values reported herein before are referred to SCE.

As working electrodes, it is possible to use any of those utilized for the gas cathodic reduction, for example Pt, Au, Ni. Platinum is particularly preferred.

In each test, about 60 ml of $\mu E$, at the desired temperature, were saturated with moist $O_2$ at atmospheric pressure.

Starting from the spontaneous potential of the system in the absence of current, a potential sweep—100 mV s$^{-1}$—was applied to the working electrode, and the circulating current was recorded as a function of the cathodic potential for different rotational speeds of the electrode. In an aqueous solution of concentrated $(NH_4)_2SO_4$ (3 moles/liter, corresponding to 396 g/l) at a pH = 5.3 and at a specific conductance of 172 milliS.cm$^{-1}$, $H_2$ evolution occurs at a cathodic potential higher than $-700$ mV (SCE).

In this case, the $O_2$-reduction limit current observed at 20° C. is equal to 2-3 $\mu A$ mm$^{-2}$ in the absence of stirring, and is equal to 5 $\mu A$ mm$^{-2}$ with $\omega = 1,500$ rpm; at 40° C., 3 $\mu A$ mm$^{-2}$ are obtained with $\omega = 0$, and about 10 $\mu A$ mm$^{-2}$ with $\omega = 1,500$ rpm.

At 60° C. and without electrode rotation, the obtained limit-current density is 30 $\mu M$ mm$^{-2}$.

In regards to the comparison with the potentials at which the same cathodic current density is observed both in microemulsion and in electrolytic aqueous solution, such comparison was conducted at the same temperature and at a pH of the electrolytic aqueous solution as close as possible to the pH of an aqueous solution of the fluorinated surfactant utilized for preparing the microemulsion.

EXAMPLES

The example given hereinafter is to be considered as merely illustrative but not limitative of the present invention.

EXAMPLE 1

The o/w microemulsion was prepared by mixing 3.24 g of monocarboxylic acid having a perfluoropolyether structure and an average equivalent weight of 542, and 0.72 g of monocarboxylic acid having the same structure and an equivalent weight to 567, salified with 2 ml of an ammonia solution at 10% by weight of $NH_3$, 7.20 g of perfluoropolyether having perfluoroalkyo end groups belonging to class 1 and having an average molecular weight of 800, 1.44 g of an alcohol having a perfluoropolyether structure and an average molecular weight of 678, 75 ml of water, and 0.2 ml of an aqueous solution of $KNO_3$ (0.1 mole/liter).

The ($\mu E$) so obtained was slightly opalescent at room temperature and became fully limpid by heating to a temperature higher than 40° C.

It exhibited a conductance of 4.05 millisiemens.cm$^{-1}$, a neutral pH, and contained 14% by weight of perfluoropolyether-structured substances dispersed in $H_2O$.

From the voltametric diagrams obtained with this o/w $\mu E$, the following was determined:

At 20° C., an $O_2$-reduction limit current density equal to 20 $\mu A$ mm$^{-2}$ without stirring and equal to 55 $\mu A$ mm$^{-2}$ at $\omega = 1500$ rpm, both values being about 10 times higher than those obtained in an aqueous electrolyte;

At 40° C., 30 $\mu A$ mm$^{-2}$ were circulating in the absence of stirring, and about 70 $\mu A$ mm$^{-2}$ at $\omega = 1500$ rpm, these values being respectively 10 and 7 times higher than the corresponding values measured in an aqueous solution.

To obtain a circulation of 50 $\mu A$ mm$^{-2}$ at $\omega = 1500$ rpm it was necessary to use, at 20° C., $-580$ mV instead of $-750$ mV, which were required in an aqueous electrolyte under the same conditions, with a power saving slightly lower than 0.01 W/mm$^2$. Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. An electrochemical process comprising reducing oxygen at a cathode using microemulsions of oil-in-water as a catholyte, said microemulsions having an electric conductance by ionic transfer of at least 1 millisiemens cm$^{-1}$ and the microemulsion of the oil-in-the-water type having a conductance of at least 1 millisiemens cm$^{-1}$ consisting essentially of a liquid, limpid or opalescent, macroscopically single-phase matter obtained by mixing:
  (a) an aqueous liquid;
  (b) a fluorinated organic compound selected from the group of perfluorocarbons and the group of perfluoropolyether-structured fluids having perfluoroalkyl or functional end groups, with carboxylic, alcoholic, polyoxyalkylene-OH, ester, or amide functionality;
  (c) a fluorinated surfactant, and
  (d) a hydrogenated alcohol $C_1$-$C_{12}$.

2. The process according to claim 1, wherein the cathode is a metal utilized in voltametric processes.

3. The process according to claim 3, wherein the cathode is Au, Pt, or Ni.

4. The process according to claim 1, wherein the fluorinated surfactant is selected from the class consisting of:
  (a) salts of the perfluoroalkylcarboxylic acids having 5 to 11 carbon atoms;
  (b) salts of the perfluorosulphonic acids having 5 to 11 carbon atoms; and
  (c) salts of mono- and di-carboxylic acids derived from perfluoropolyethers.

5. The process according to claim 1, wherein the fluorinated surfatant is of the non-ionic type substituted by a perfluoroalkyl chain and by a polyoxyalkylene hydrophilic head.

6. The process according to claim 1, wherein the oil is a perfluorocarbon.

7. The process according to claim 1, wherein the oil is a perfluoropolyether selected from the class consisting of:
  (a) perfluoropolyether having an average molecular weight from 500 to 10,000 with perfluoroalkyl end groups and belonging to one or more of the following classes:

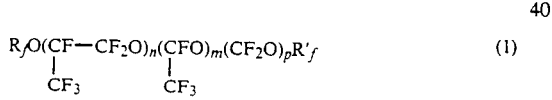   (1)

with a random distribution of the perflurooxyalkylene units, wherein $R_f$ and $R'_f$, alike or different from each other are —$CF_3$, —$C_2F_5$, or —$C_3F_7$, and m, n, p have average values to meet the above average molecular weight requirements, (2) $R_fO(CF_2CF_2O)_n(CF_2O)_mR'_f$, with a random distribution of the perfluorooxyalkylene units, where $R_f$ and $R'_f$, alike or different from each other, are —$CF_3$ or —$C_2F_5$ and m and n have means values to meet the above molecular weight requirements,

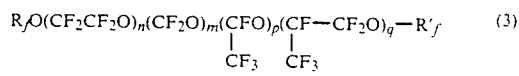   (3)

with a random distribution of the perfluorooxyalkylene units, where $R_f$ and $R'_f$, alike or different from each other, are —$CF_3$, —$C_2F_5$, —$C_3F_7$, and m, n, p, q have mean values to meet the above molecular weight requirements,

   (4)

where $R_f$ and $R'_f$, alike or different from each other, are —$CF_3$ or —$C_2F_7$, and n has a mean value to meet the above molecular weight requirements, (5) $R_fO(CF_2CF_2O)_nR'_f$, where $R_f$ and $R'_f$, alike or different from each other, are —$CF_3$, —$C_2F_5$, and n has a mean value to meet the above molecular weight requirements, (6) $R_fO(CF_2CF_2CF_2O)_nR'_f$, where $R_f$ and $R'_f$, alike or different from each other, are —$CF_3$, $C_2F_5$ or —$C_3F_7$, n having a mean value to meet the above molecular weight requirements,
  (7) perfluoropolyether having the structure of class 1 or class 3, wherein one of end groups $R_f$ and $R'_f$, contains one or two chlorine atoms,
  (b) perfluoropolyether belonging to the above-described classes, having an average molecular weight ranging from 1,500 to 10,000, characterized in containing on the average from 0.1 to 4 non-perfluoroalkyl end group for each polymeric chain;
  (c) perfluoropolyether having functional groups along the perfluoropolyether chain and end groups of the perfluoroalkyl or functional type.

8. The process according to claim 7, wherein perfluoropolyether has an average molecular weight from 600 to 6,000.

9. An electrochemical process according to claim 1, wherein the aqueous liquid contains at least one electrolyte.

10. An electrochemical process according to claim 1, wherein the functional groups are hydrophilic including carboxylic, polyoxyalkylene-OH groups, and the carboxylic groups.

11. An electrochemical process according to claim 1, wherein the fluorinated surfactant has a perfluoropolyether structure.

12. An electrochemical process according to claim 1 wherein the hydrogenated alcohol contains a fluorinated alcohol as a cosurfactant.

* * * * *